United States Patent

Harayama et al.

[11] Patent Number: 6,054,225
[45] Date of Patent: Apr. 25, 2000

[54] COMPOSITE CHROMIUM PLATING FILM AND SLIDING MEMBER COVERED THEREOF

[75] Inventors: Akira Harayama; Toshiaki Imai, both of Okaya, Japan

[73] Assignee: Teikoku Piston Ring Co., Ltd., Tokyo, Japan

[21] Appl. No.: 08/966,977

[22] Filed: Nov. 10, 1997

[30] Foreign Application Priority Data

Nov. 11, 1996 [JP] Japan ..................... 8-314297

[51] Int. Cl.[7] .............. B32B 15/00; B23P 15/00; C25D 15/00; C23C 28/00
[52] U.S. Cl. ............ 428/667; 428/687; 205/113; 205/197; 205/109; 205/110; 277/443; 277/444
[58] Field of Search ..................... 428/627, 666, 428/667, 687; 205/113, 197, 109, 110; 277/443, 444

[56] References Cited

U.S. PATENT DOCUMENTS

| | | | |
|---|---|---|---|
| 3,770,286 | 11/1973 | Angilella et al. | 277/235 |
| 3,886,637 | 6/1975 | Ellis et al. | 29/156.4 |
| 4,704,336 | 11/1987 | Spriggs | 428/552 |
| 4,846,940 | 7/1989 | Neuhauser et al. | 204/16 |
| 4,873,150 | 10/1989 | Doi et al. | 428/627 |

FOREIGN PATENT DOCUMENTS

| | | |
|---|---|---|
| 59-028640 | 7/1984 | Japan . |
| 61-3895 | 1/1986 | Japan . |
| 62-56600 | 3/1987 | Japan . |
| 62-120498 | 6/1987 | Japan . |

*Primary Examiner*—John J. Zimmerman
*Assistant Examiner*—Jason Resnick
*Attorney, Agent, or Firm*—Armstrong, Westerman, Hattori, McLeland & Naughton

[57] ABSTRACT

A piston ring is formed with a nitrided layer over all surfaces and formed with a composite chromium plating film over the nitrided layer in the outer circumferential surface. The composite chromium plating film has a network of cracks formed on the outer surface and interior. Spherical alumina particles are fixed in these cracks. The average size of the spherical alumina particles is 0.7 to 10 $\mu$m and the dispersion ratio of the spherical alumina particles is 3 to 15 percent by volume.

6 Claims, 7 Drawing Sheets

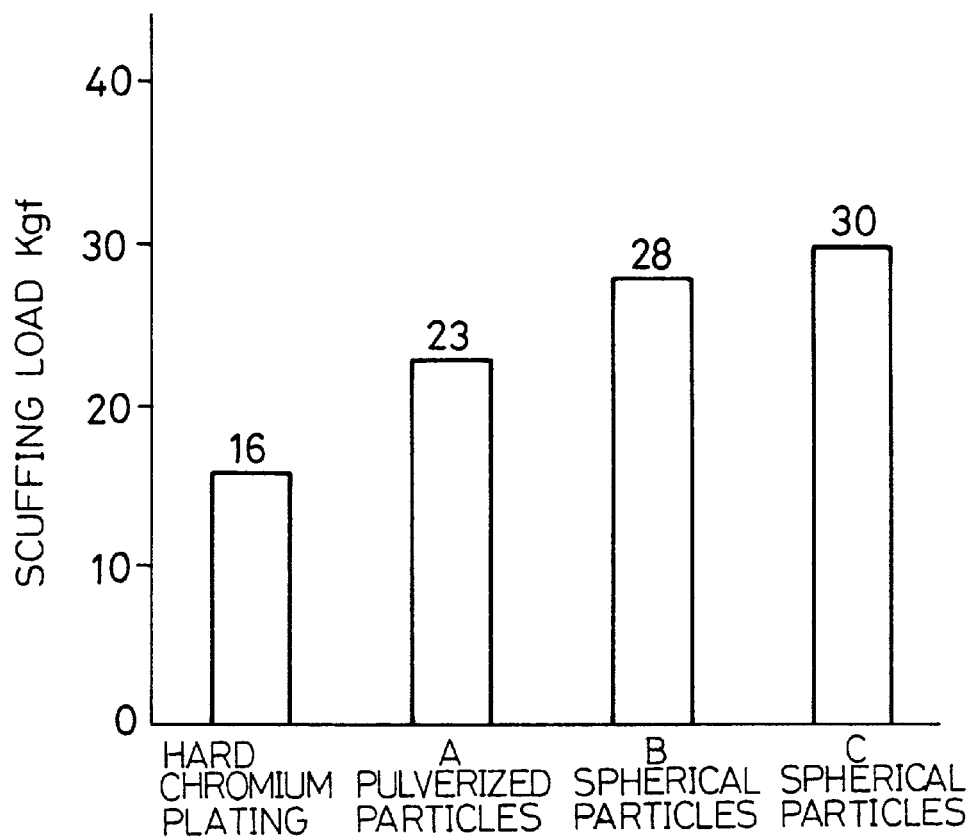

COMPOSITE CHROMIUM PLATING FILM AND SLIDING MEMBER COVERED THEREOF

BACKGROUND OF THE INVENTION

1. Technical Field of the Invention

This invention relates to a composite chromium plating film containing hard particles in a network of cracks formed on the hard chromium plating film and to sliding members covered with said film such as vanes in compressors or piston rings in internal combustion engines.

2. Description of the Related Art

Dispersing hard particles within a hard chromium plating film has been attempted to improve the wear resistance of the chromium plating film. Methods proposed up until now for dispersing hard particles within the hard chromium plating film are as follows.

A pulse electrolytic method (Japanese Patent Publication No. 59-028640) electrolyzing repetitively utilizing a comparatively low current density for codeposition of the hard particles and, a current density at which the chromium plating electrically deposits at normal speed.

A method (Japanese Patent Laid-open No. 61-003895) adding rare earth elements or compounds of rare earth elements to the chromium plating bath.

A method (Japanese Patent Laid-open No. 62-120498) adding self-lubricating particles and hard particles to a trivalent chromium plating bath.

However these methods had drawbacks in that none of these methods were practical to use and these methods proved difficult to reproduce in our follow-up testing. Further problems were that the dispersion ratio was extremely low or the plating speed was extremely low.

The purpose of the composite chromium plating films mentioned above is to uniformly disperse hard particles into the hard chromium plating film. There is another method using a network of enlarged cracks containing hard particles in the hard chromium plating film (Japanese Patent Laid-open No. 62-56600). This method provided a composite chromium plating with satisfactory plating speed, control of the dispersion ratio and reproducibility.

The items disclosed in the Japanese Patent Laid-open No. 62-56600 are as follows.

Composite chromium plating film thickness: 10–1000 $\mu$m

Crack width: 0.5 $\mu$m or more, and even 1 $\mu$m or more

Hard particle size: 0.5 to 15 $\mu$m (0.5 to 5 $\mu$m in the embodiment)

Hard particles: WC, $Al_2O_3$, SiC, $Si_3N_4$, BC, diamond

This composite chromium plating film is actually utilized for piston rings in certain low-load diesel engines in Europe. The specifications for this commercially utilized composite chromium plating film are as follows.

Film thickness: 100–200 $\mu$m

Film hardness: Vickers hardness 850 to 1000

Hard particles: $Al_2O_3$ (pulverized particles)

Hard particles average size: 4.5 $\mu$m

Hard particles dispersion ratio: 5 percent by volume

However this piston ring covered with the above mentioned composite chromium plating film possesses excellent self wear resistance and scuffing resistance, but wears down the mating material by large amounts and causes problems by drastically increasing the cylinder bore wear. Accordingly the piston ring formed with the above mentioned composite chromium plating film is unsuitable for use in high load diesel engines or gasoline engines.

The shape of hard particles and their total content in the above mentioned composite chromium plating film is thought to influence the amount of wear on the mating material, but the Japanese Patent Laid-open No. 62-56600 makes absolutely no mention of this. Further, unlike the composite plating of nickel or Ni—Co—P types used in the conventional art, the above mentioned composite chromium plating has a different hard particle distribution and matrix metal, so alleviating the wear on piston ring mating material by utilizing the available knowledge of composite platings in the conventional art is impossible.

SUMMARY OF THE INVENTION

It is an object of this invention to provide a composite chromium plating film containing hard particles in a network of cracks formed in a hard chromium plating film, giving superior wear resistance and scuffing resistance and little wear on the sliding surface of the mating material. Another object of this invention is to provide sliding members such as piston rings having a covering of the above composite chromium plating film.

A composite chromium plating film of this invention contains hard particles in a network of cracks formed in a hard chromium plating film. The hard particles are spherical particles. Average size of the hard particles is 0.7 to 10 $\mu$m, and dispersion ratio of the hard particles is 3 to 15 percent by volume.

The composite chromium plating film is used for covering the sliding surface of sliding members such as vanes in compressors or piston rings in internal combustion engines (such as high load diesel engines or gasoline engines), thereby providing a sliding member having excellent sliding characteristics.

The composite chromium plating film of this invention can be formed by utilizing a chromium plating bath containing specified amounts of dispersed hard particles and by repetitive performance of the composite chromium plating processes and etching processes.

The density of the network of cracks formed in the composite chromium plating processes and etching processes can be simply expressed by the number of cracks intersecting parallel lines (length 1 mm) on the plating surface. The crack density is in a range from 0 (crackless) to 200 lines per millimeter (microcrack plating). When crack density is high, the strength of the plating film decreases and conversely when the crack density is low, a high dispersion ratio of hard particles cannot be obtained. The preferred range of crack density in this invention is from 40 to 90 lines per millimeter.

The cross section of the crack is a rough V shape and the width of the opening must be larger than the size of the hard particle. When the width of the opening is small, the dispersion ratio of the hard particles can not be increased and conversely when too large, the strength of the film decreases. A preferred opening width range is generally from 4 to 10 $\mu$m.

The edge surface of the hard particles forms the primary sliding surface in the composite chromium plating film and the chromium plating surface forms the secondary sliding surface.

The particle shape in the composite chromium plating film is thought to make a difference in the wear caused on the mating sliding material. In tests for composite chromium plating involving alumina particles of different shapes but having the same size and dispersion ratio, particles having a sharp-angled tip were confirmed to cause excessive wear on the mating material. Accordingly, spherical hard particles not having sharp angles are preferred.

Even if the dispersion ratio of the spherical hard particles is increased, the wear exerted on the mating material is not increased. Pulverized (hereafter mean-ng particles with sharp angles) hard particles such as alumina particles exert high wear on the mating material as the dispersion ratio is increased. A high dispersion ratio for hard particles is preferred in order to obtain satisfactory wear resistance and scuffing resistance. Chromium plating film containing spherical hard particles at a volumetric ratio of 3 percent or more, exerts much less wear on the mating material when compared with chromium plating film containing usual pulverized hard particles such as alumina particles.

The cracks must be enlarged in order to increase the dispersion ratio, but increase in crack size is limited, so the dispersion ratio cannot be increased over 15 percent by volume.

The wear caused on the mating sliding surface increases when the size of the hard particles is large. When the size of the $Si_3N_4$ particles is small, the self wear increases. A preferable average size (powder grain size) range for the hard particles is 0.7 to 10 μm.

BRIEF DESCRIPTION OF THE DRAWINGS

The aforesaid and other objects and features of the present invention will become more apparent from the following detailed description and the accompanying drawings.

FIG. 1a is a longitudinal cross sectional view showing a portion of the piston ring. FIG. 1b is an enlarged view seen from the direction perpendicular to the plating surface, showing a portion of the composite chromium plating film of the piston ring.

FIG. 2a shows a portion of the film after one cycle of composite chromium plating processing and etching processing. FIG. 2b shows a portion of the film after two cycles of composite chromium plating processing and etching processing.

FIG. 7 is a graph showing test data from the scuffing test.

DESCRIPTION OF THE PREFERRED EMBODIMENTS

Figure 1A:
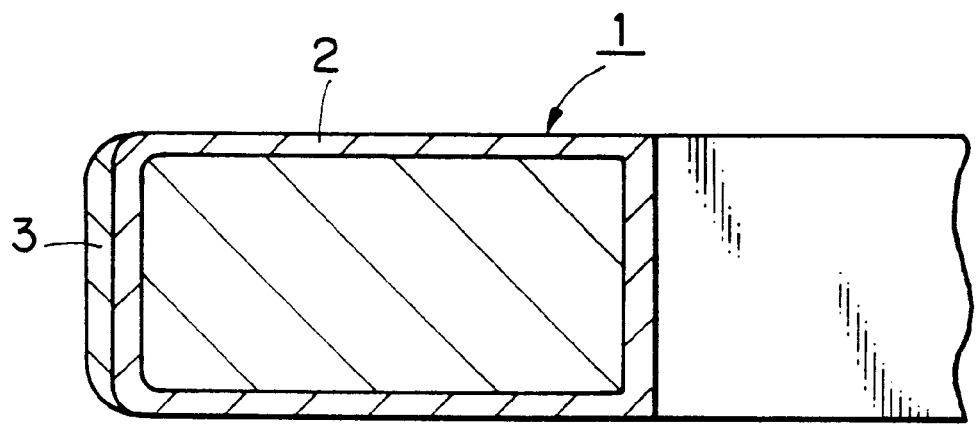
FIGS. 1a and 1b show one embodiment of this invention.
Figure 1B:
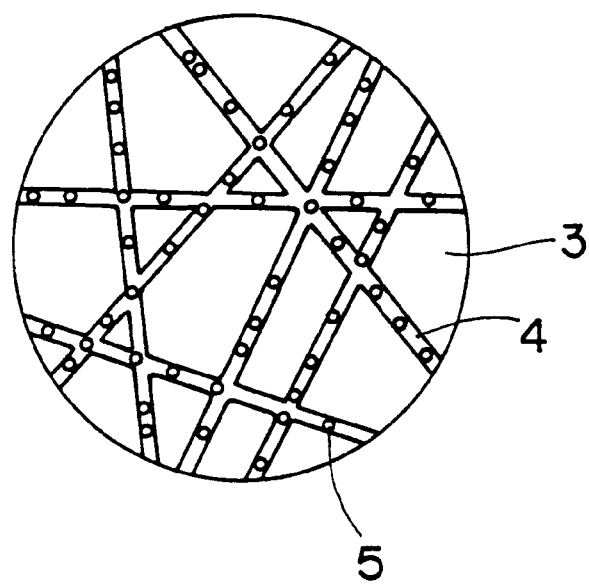

FIG. 1 shows a cross sectional longitudinal views of one portion of the piston ring of one embodiment of this invention. A nitrided layer 2 is formed over the entire surface of a piston ring 1 and a composite chromium plating film 3 is formed over the nitrided layer 2 in the outer circumferential surface. The composite chromium plating film 3 has a network of cracks 4 on the surface and interior of the film as seen from the direction perpendicular to the plated surface, and spherical alumina particles 5 not having sharp angles are embedded in the cracks 4. The average particle size of the spherical alumina particles 5 is 0.7 to 10 μm and the dispersion ratio of the spherical alumina particles 5 is 3 to 15 percent by volume.

The plating process for the composite chromium plating film 3 of the piston ring 1 is described next.

After the initial composite chromium plating, a composite chromium plating process and an etching process are repetitively performed on the outer circumferential surface of the piston ring.

Conditions for composite chromium plating bath, as well as composite chromium plating process and etching process are listed in an example below. The initial composite chromium plating is a strike plating normally requiring 3 to 10 minutes and other conditions are the same as shown below.

Plating bath $CrO_3$: 250 g/l $H_2SO_4$: 1.0 g/l $H_2SiF_6$: 5 g/l

Hard particles (spherical alumina): 20 g/l

Average size of the hard particles is 0.7 μm.

Using plating bath containing fluoride provides superior adhesion between chromium plating layers in the composite chromium plating process and etching process cycle.

Composite chromium plating

Current density: 60 A/dm$^2$

Plating bath temperature: 55° C.

Plating time: 10 minutes

Etching

Current density: 50 A/dm$^2$

Plating bath temperature: 55° C.

Etching time: 1 minute

Figure 2A:
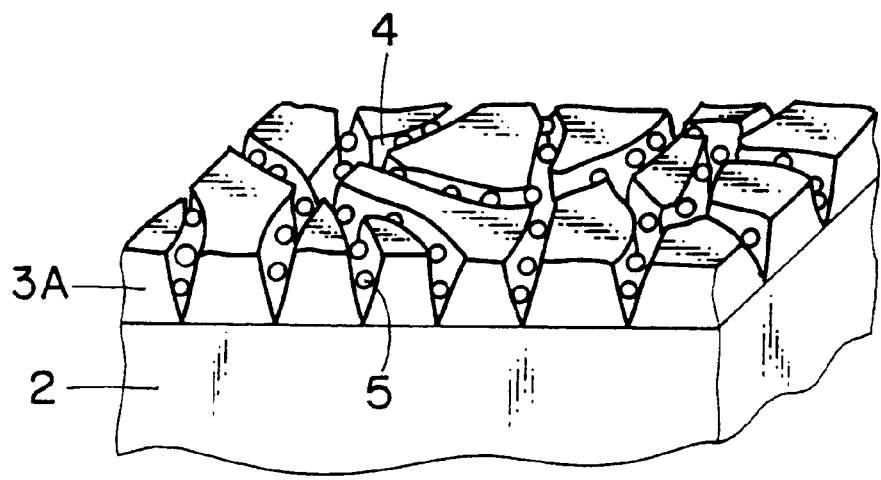
FIGS. 2a and 2b are oblique views describing the manufacturing process for the composite chromium plating film for the piston ring.

When one cycle of composite chromium plating processing and etching processing is performed under the above conditions, a composite chromium plating film 3A is formed over the nitrided layer 2 in the outer circumferential surface of the piston ring 1 as shown in FIG. 2a. On the surface of the composite chromium plating film 3A, a network of the cracks 4 are formed and the spherical alumina particles 5 are embedded in the cracks 4.

Figure 2B:
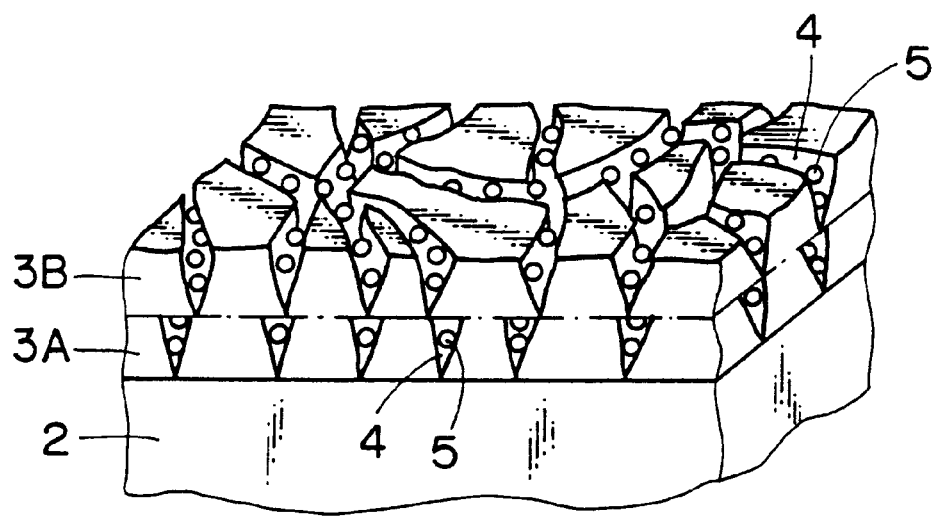

Also, as shown in FIG. 2b, when the composite chromium plating processing and etching processing are repetitively performed, a further composite chromium plating film 3B is laminated on the composite chromium plating film 3A formed in the initial cycle of the processing. Accordingly, the spherical alumina particles 5 in the cracks 4 of the initial composite chromium plating film 3A are embedded in place within the films. On the surface of the composite chromium plating film 3B of the second layer, a network of the cracks 4 are formed and the spherical alumina particles 5 are embedded in the cracks 4.

Hereafter, when the composite chromium plating processing and etching processing are repetitively performed by the specified cycles, the composite chromium plating film 3 having the specified thickness is formed over the nitrided layer 2 in the outer circumferential surface of the piston ring 1.

When one cycle of the composite chromium plating processing and etching processing is performed under the above conditions, a plating thickness of approximately 10 μm can be obtained, so for instance in order to obtain the composite chromium plating film 3 with a finished thickness of 100 μm, 12 cycles are performed in order to obtain a plating thickness of 120 μm, since an extra margin (20 μm) must be added for grinding.

Next, the data obtained from the wear test using toe reciprocating friction testing machine is explained.

Figure 3:
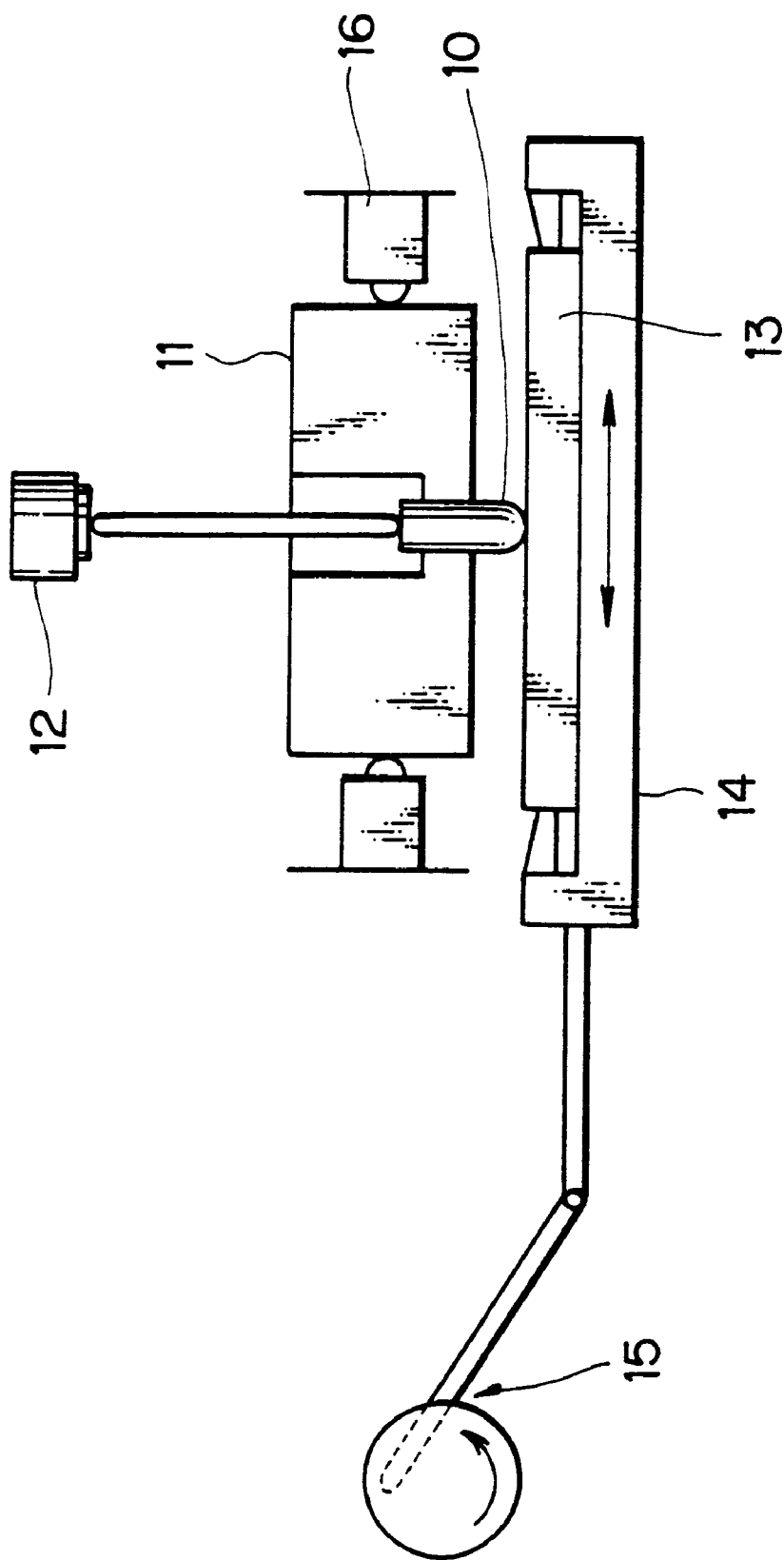
FIG. 3 is a drawing showing the reciprocating friction testing machine.

FIG. 3 shows an outline of the reciprocating friction testing machine used in the test. A pin-shaped upper test piece 10 is supported by a fixed block 11, and a downward load is applied from above by a hydraulic cylinder 12 to press contact on a lower test piece 13. The flat base shaped lower test piece 13 is supported by a movable block 14 and moved back and forth by a crank mechanism 15. The numeral 16 denotes a load cell.

Test conditions were as follows.
Load: 98N
Speed: 600 cpm
Stroke: 50 mm
Time: 1 hour
Lubricating oil: Bearing oil having viscousness equivalent to light oil

[Wear test 1]

The effect exerted in terms of wear on the mating material according to the shape of hard particles and their content in the film was tested with the above mentioned reciprocating friction testing machine.

(1) Test piece
Upper test piece: Cast iron material used for cylinder liners
Lower test piece: Lower test piece was made from steel used for piston rings and covered on the surface with composite chromium plating Using the above test pieces is convenient to estimate wear caused on the mating material by the composite chromium plating film since the interrelation of the upper and lower test pieces allows wear to develop on the upper test piece.

(2) Composite chrome plating
Composite chrome plating was the same as described for the piston ring 1 in the embodiment of this invention. However the hard particles in the plating bath were as shown in Table 1.

TABLE 1

| Type | Average Particle Size µm | Shape | Manufacturer & Specifications |
|---|---|---|---|
| Alumina | 1.0 | Pulverized Particles | Showa Denko (Inc.) White morandum (registered trademark) WA#8000 |
| Alumina | 0.7 | Spherical Particles | Adomatex Co., Ltd. high-purity synthetic spherical alumina AO-502 |

(3) Test method
The wear test was performed in the different dispersion ratios (volumetric ratio) of the hard particles with the above mentioned reciprocating friction testing machine.

Figure 4:
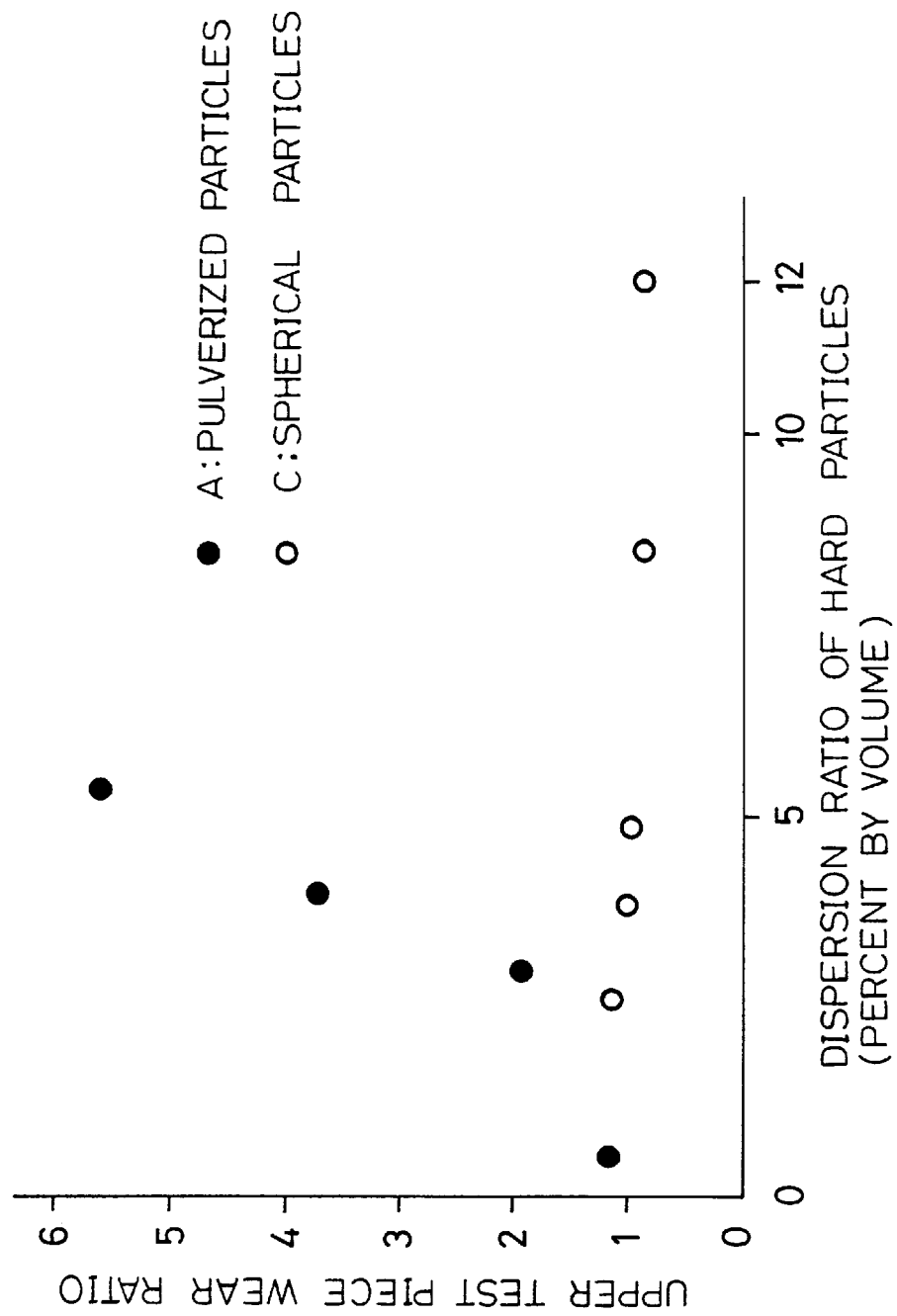
FIG. 4 is a graph showing test data from the wear test 1.

(4) Results
Results of wear on the upper test piece (mating material) versus the dispersion ratio of hard particles are shown in FIG. 4. The test was performed with the lower test piece covered with the usual hard chromium plating film. The wear ratio in FIG. 4 was set as 1 for the amount of wear on the upper test piece (mating material) when the lower test piece is covered with the hard chromium plating film. As can be seen in FIG. 4, when the content of pulverized alumina particles in the composite chromium plating film was increased, the amount of wear on the upper test piece (mating material) suddenly increased. In contrast, even if the spherical alumina particle content in the composite chromium plating film was increased, the amount of wear on the upper test piece (mating material) did not increase.

[Wear test 2]

The effect exerted in terms of wear on the mating material and self-wear according to the shape of the hard particles was tested with the above mentioned reciprocating friction testing machine.

(1) Test piece
Upper test piece: Upper test piece was made from steel used for piston rings and covered on the surface with composite chromium plating.
Lower test piece: Cast iron material used for cylinder liners.

(2) Composite chromium plating
Plating was performed just as with the composite chromium plating for the piston ring 1 described in the embodiment of this invention. The hard particles in the plating bath however were as shown in Table 2.

TABLE 2

| Powder Symbol | Type | Average Particle Size µm | Dispersion ratio % (volumetric ratio) | Shape | Manufacturer & Specifications |
|---|---|---|---|---|---|
| A | Alumina | 1.0 | 7.5 | Pulverized particles | Showa Denko (Inc.) White Morandum (registered trademark) WA#8000 |
| B | Alumina | 10.0 | 5.0 | Spherical particles | Showa Denko (Inc.) spherical alumina AS-50 |
| C | Alumina | 0.7 | 10.5 | Spherical particles | Adomatex Co., Ltd. high-purity synthetic spherical alumina AO-502 |

(3) Test method
The wear test was performed with the above mentioned reciprocating friction testing machine.

Figure 5:
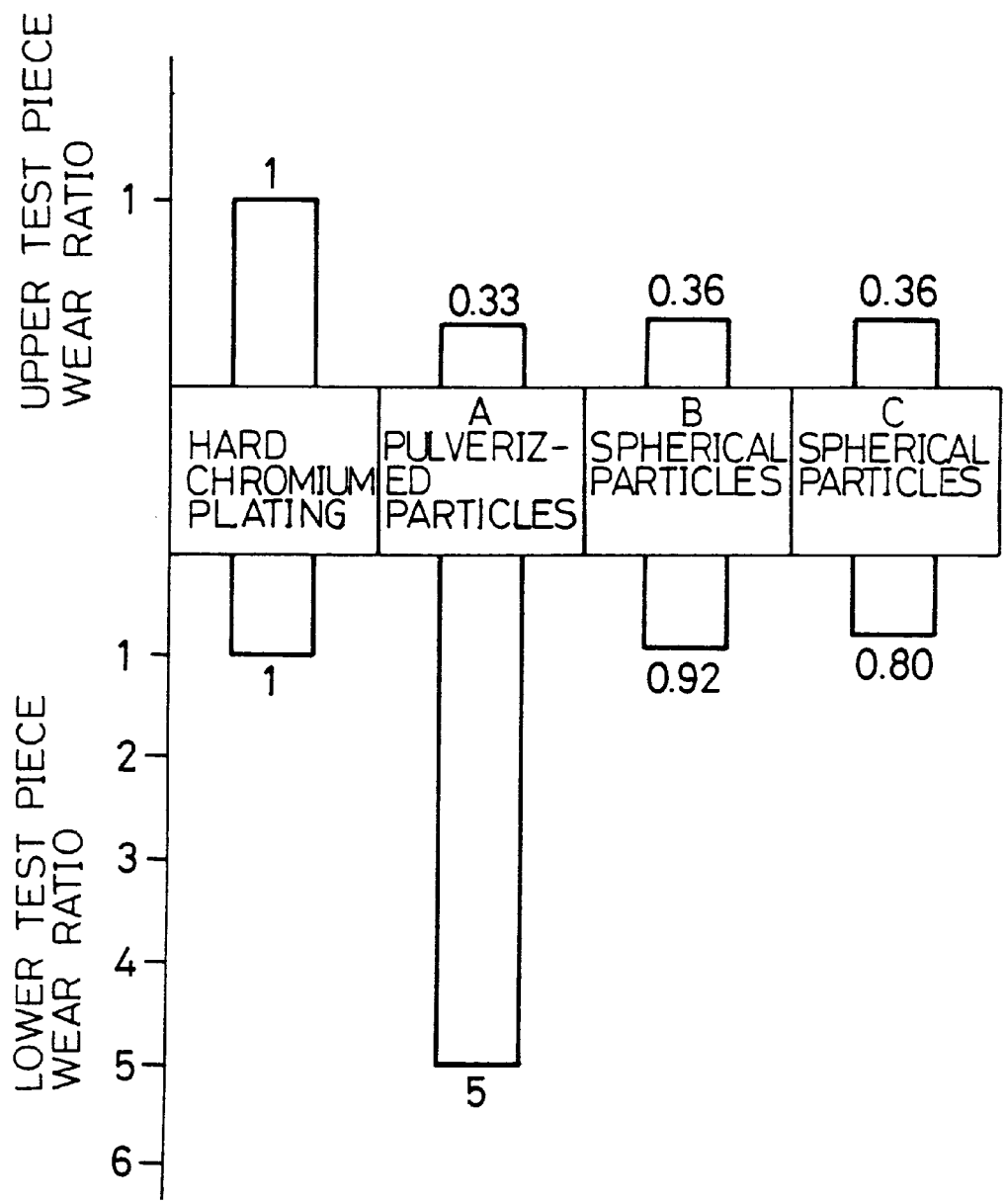
FIG. 5 is a graph showing test data from the wear test 2.

(4) Results
Results of wear amounts on the upper and lower test pieces are shown in FIG. 5. The test was performed with the upper test piece covered with the usual hard chromium plating film. The wear ratio in FIG. 5 was set as 1 for the amount of wear on the upper test piece when covered with the hard chromium plating film. As can be seen in FIG. 5, when the composite chromium plating film contained pulverized alumina particles, the amount of self wear was one-third compared to the hard chromium plating film but the amount of wear on the mating material increased five-fold.

In contrast, the composite chromium plating film containing spherical alumina particles had a self-wear of approximately one-third versus the hard chromium plating film and the wear on the mating material was about the same. Therefore, the composite chromium plating film containing spherical alumina particles was superior in terms of self wear and wear exerted on the mating material.

The results of the scuffing tests performed with the high surface pressure scuffing testing machine are explained next.

Figure 6:
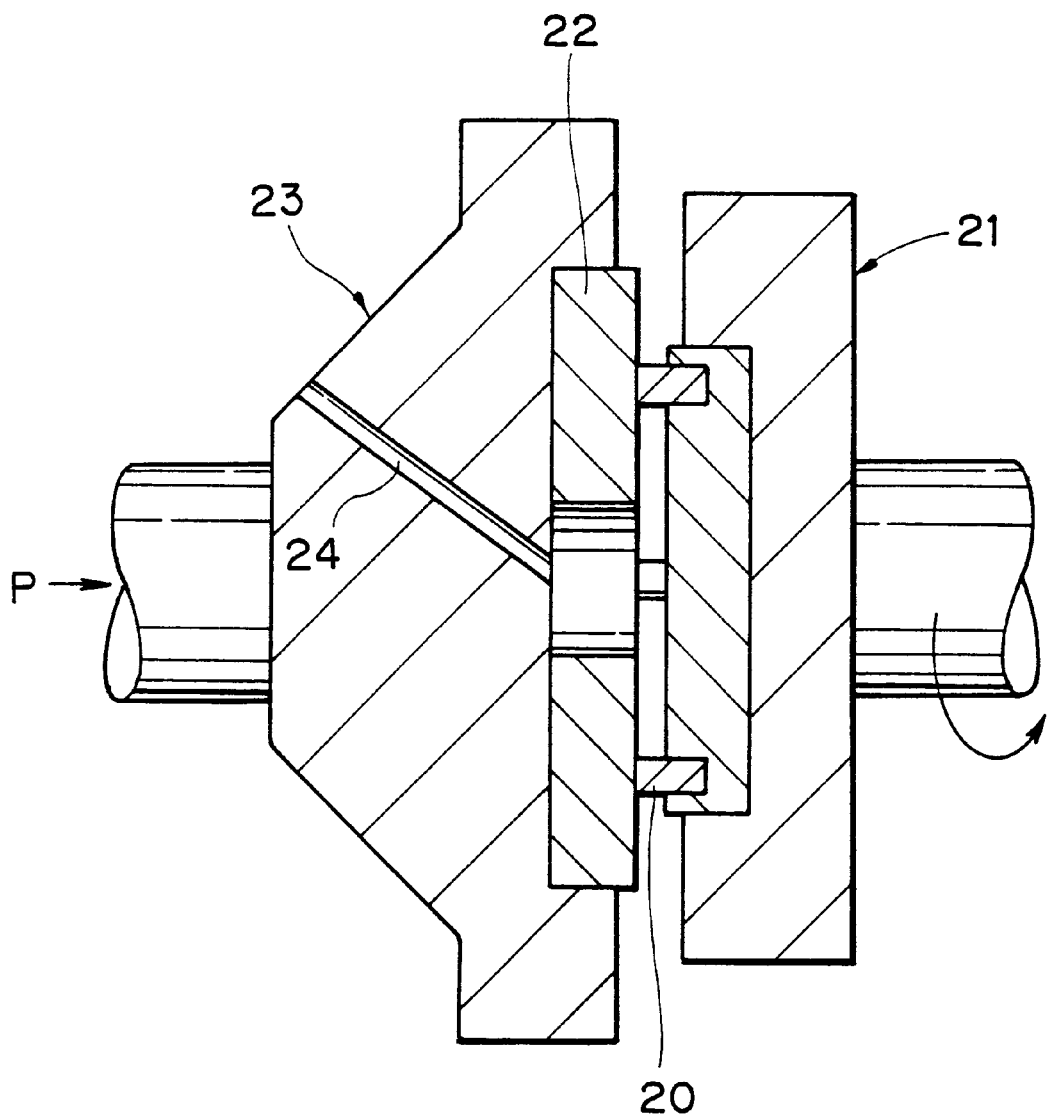
FIG. 6 is a drawing showing the high surface pressure scuffing testing machine.

FIG. 6 shows an outline of the high surface pressure scuffing testing machine used for the test. A test piece 20 is held by a rotor 21 and made to rotate by the rotor 21. On the other hand, a mating test piece 22 is held by a stator 23 and pressed by a hydraulic unit against the rotor 21 by a specified load P.

In a device of this type, a specified amount of lubricating oil flows on the sliding surfaces from an oil hole 24 formed in the stator 23 while the test piece 20 is rotated. The load acting on the test piece 20 increases in stages at fixed intervals of time, the torque generation by the sliding movement of the test piece 20 and the mating test piece 22 is measured with a torque meter and recorded on a recording meter. The torque suddenly increases when the scuffing phenomenon occurs. Accordingly, the load acting on the test piece 20 when the torque suddenly increases is set at the scuffing load and the scuffing characteristic pass-fail is determined by how large or small this scuffing load is.

Test conditions were as follows.

Rotation speed: 8 m/s

Load: Starts at 20 kgf and increases in 10 kgf/min steps

Lubricating oil: Light oil

Oil temperature: 80° C.

[Scuffing test]

The effect that the particle shape exerts on the scuffing characteristic was tested using the above mentioned high surface pressure scuffing testing machine.

(1) Test piece

Upper test piece: Upper test piece was made from steel used for piston rings and covered on the surface with composite chromium plating.

Mating test piece: Cast iron material used for cylinder liners.

(2) Composite chromium plating

Same as for above mentioned wear test 2.

(3) Test method

The scuffing test was performed using the above mentioned high surface pressure scuffing testing machine.

(4) Results

Scuffing loads of the test pieces which were obtained from the scuffing test are shown in FIG. 7. The test was performed with the test piece covered with the usual hard chromium plating film. As can be seen in FIG. 7, the composite chromium plating film containing alumina particles had superior scuffing resistance compared to the the hard chromium plating film. Further, the test revealed that the composite chromium plating film containing spherical particles has superior scuffing resistance compared to the film containing pulverized particles. Also, the composite chromium plating film containing the spherical alumina particles (C) showed the high scuffing load.

Although the present invention has been described with reference to the preferred embodiments, it is apparent that the present invention is not limited to the aforesaid preferred embodiments, but various modification can be attained without departing from its scope.

What is claimed is:

1. A composite chromium plating film containing hard particles in a network of cracks formed in a hard chromium plating film, wherein said hard particles are spherical particles, the average size of said hard particles is 0.7 to 10 μm, and the dispersion ratio of said hard particles is 3 to 15 percent by volume.

2. A composite chromium plating film as claimed in claim 1, in which said hard particles are alumina particles.

3. A sliding member having said composite chromium plating film of claim 1 formed on the sliding surface of said sliding member.

4. A sliding member as claimed in claim 3, in which said sliding member is a piston ring having said composite chromium plating film formed on the outer circumferential surface of said piston ring.

5. A sliding member as claimed in claim 4, in which a nitrided layer is formed on the upper and lower surfaces of said piston ring.

6. A method of producing a composite chromium plating film as claimed in claim 2 comprising repetitive performance of a composite chromium plating process and an etching process in an chromium plating bath containing spherical hard particles.

* * * * *